US012413062B2

(12) United States Patent
Peterson et al.

(10) Patent No.: US 12,413,062 B2
(45) Date of Patent: Sep. 9, 2025

(54) MOUNTING DEVICE FOR SECURING AND ROUTING ELONGATED ARTICLES

(71) Applicant: Aptiv Technologies AG, Schaffhausen (CH)

(72) Inventors: David R. Peterson, Aurora, OH (US); Joseph Sudik, Jr., Niles, OH (US); David Siegfried, Warren, OH (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 190 days.

(21) Appl. No.: 18/237,050

(22) Filed: Aug. 23, 2023

(65) Prior Publication Data

US 2025/0070540 A1 Feb. 27, 2025

(51) Int. Cl.
*H02G 3/30* (2006.01)
(52) U.S. Cl.
CPC ..................... *H02G 3/30* (2013.01)
(58) Field of Classification Search
CPC ......................................................... H02G 3/30
USPC ............................................................ 174/50
See application file for complete search history.

(56) References Cited

U.S. PATENT DOCUMENTS

| 7,913,957 | B2* | 3/2011 | Nelson | F16B 21/02 |
| | | | | 248/65 |
| 8,028,962 | B2* | 10/2011 | Geiger | F16L 3/2332 |
| | | | | 248/65 |
| 9,899,822 | B2* | 2/2018 | Richardson | H02G 3/32 |
| 2003/0231943 | A1* | 12/2003 | Detter | F16B 19/004 |
| | | | | 411/510 |
| 2007/0257159 | A1* | 11/2007 | Nelson | F16L 3/137 |
| | | | | 248/73 |

* cited by examiner

*Primary Examiner* — Timothy J Thompson
*Assistant Examiner* — Michael F McAllister
(74) *Attorney, Agent, or Firm* — Billion & Armitage

(57) ABSTRACT

A mounting device configured to attach an elongated article to a substrate includes a base portion and an attachment portion extending from the base portion. The attachment portion is configured to be received within an opening in the substrate and has a plurality of branches extending therefrom. The mounting device also includes a cap portion that is spaced apart from the base portion and defining an aperture in which the attachment portion is received. The plurality of branches engage the aperture and are configured to inhibit removal of the attachment portion from the aperture. The mounting device further includes a plurality of legs extending between the base portion and the cap portion that is configured to retain the elongated article between the base portion and the cap portion. A method of attaching an elongated article to a substrate using such a mounting device is also described.

20 Claims, 8 Drawing Sheets

MOUNTING DEVICE FOR SECURING AND ROUTING ELONGATED ARTICLES

TECHNICAL FIELD OF THE INVENTION

This disclosure generally relates to a mounting device for securing elongated articles, such are electrical cables to a substrate and routing the elongated articles.

BACKGROUND

Securing a flat flexible electrical cable (FFC) and/or a flexible printed circuit (FPC) to a substrate such as a body panel of a vehicle, and routing the FFC or FPC, along the substrate an/or through a structure presents problems due to a tendency of the FFC and FPC to buckle if it is not properly contained at the attachment point. Additional issues with FFC and FPC is that they are typically folded over to make turns or bends in a horizontal plane. However, the indexing of the conductor is swapped by the folding. This requires the number and location of folds to be carefully accounted for to guarantee proper indexing of the conductors in the FFC or FPC. Further, the current mounting devices for FFC and FPC are not well suited for automated installation.

SUMMARY

According to one or more aspects of the present disclosure to a mounting device configured to attach an elongated article to a substrate includes a base portion and an attachment portion extending from the base portion that is configured to be received within an opening in the substrate. The attachment portion defines a plurality of branches extending therefrom. The mounting device also includes a cap portion that is spaced apart from the base portion. The cap portion defines an aperture in which the attachment portion is received. The plurality of branches engage the aperture and are configured to inhibit removal of the attachment portion from the aperture. A plurality of legs extending between the base portion and the cap portion are configured to retain the elongated article between the base portion and the cap portion.

In some aspects of the mounting device described in the previous paragraph, the elongated article is a flat electrical cable.

In some aspects of the mounting device described in any one of the previous paragraphs, the mounting device is configured to retain the flat electrical cable between the base portion, the attachment portion, the cap portion and at least one leg of the plurality of legs.

In some aspects of the mounting device described in any one of the previous paragraphs, the attachment portion and the aperture are sized, shaped and arranged such that the attachment portion and the aperture are aligned in a single particular orientation.

In some aspects of the mounting device described in any one of the previous paragraphs, the attachment portion has a rounded triangular cross-section, and the aperture has a corresponding rounded triangular shape.

In some aspects of the mounting device described in any one of the previous paragraphs, the plurality of legs extend from the cap portion.

In some aspects of the mounting device described in any one of the previous paragraphs, the plurality of legs extend through holes defined in the attachment portion.

In some aspects of the mounting device described in any one of the previous paragraphs, the plurality of legs are jointed and extend between the cap portion and the attachment portion.

In some aspects of the mounting device described in any one of the previous paragraphs, a pair of legs in the plurality of legs have joints that are configured to allow the pair of legs to flex away from each other.

In some aspects of the mounting device described in any one of the previous paragraphs, the plurality of legs extend from the attachment portion.

In some aspects of the mounting device described in any one of the previous paragraphs, the plurality of legs extend from an edge of the attachment portion and beyond the cap portion.

In some aspects of the mounting device described in any one of the previous paragraphs, the substrate serves as the cap portion.

In some aspects of the mounting device described in any one of the previous paragraphs, the mounting device further includes the elongated article which is a first elongated article that is positioned between the base portion, the attachment portion, the cap portion, and m legs of the plurality of legs. The mounting device further includes a second elongated article which is positioned between the base portion, the attachment portion, the cap portion, and m+n legs of the plurality of legs; m and n are nonzero integers.

In some aspects of the mounting device described in any one of the previous paragraphs, the first elongated article has a first radius of curvature around the attachment portion and the second elongated article has a second radius of curvature around the attachment portion that is shorter than the first radius of curvature.

According to one or more aspects of the present disclosure, a method of attaching an elongated article to a substrate includes the steps of:
  providing a mounting device having a base portion, an attachment portion extending from the base portion. The attachment portion defines a plurality of branches extending therefrom. The mounting device also has a cap portion that is spaced apart from the base portion. The cap portion defines an aperture in which the attachment portion is received. The plurality of branches engage the aperture and are configured to inhibit removal of the attachment portion from the aperture. The attachment portion also has a plurality of legs extending between the base portion and the cap portion that is configured to retain the elongated article between the base portion and the cap portion;
  disposing the elongated article in the mounting device such that it is positioned between the base portion, the attachment portion, the cap portion, and m legs of the plurality of legs, wherein m is a nonzero integer; and
  inserting the attachment portion within an opening in the substrate, wherein the plurality of branches engage the opening and are configured to inhibit removal of the attachment portion from the opening.

In some aspects of the method described in the previous paragraph, the attachment portion and the opening are sized, shaped and arranged such that the attachment portion and the opening are aligned in a single particular orientation.

In some aspects of the method described in any one of the previous paragraphs, the attachment portion has a rounded triangular cross-section, and the opening has a corresponding rounded triangular shape.

In some aspects of the method described in any one of the previous paragraphs, the elongated article is a first elongated article and wherein the method further includes routing a second elongated article through the mounting device such that it is positioned between the base portion, the attachment portion, the cap portion, and m+n legs of the plurality of legs, wherein n is a nonzero integer.

BRIEF DESCRIPTION OF THE DRAWINGS

The present invention will now be described, by way of example with reference to the accompanying drawings, in which.

DETAILED DESCRIPTION

Figure 1:
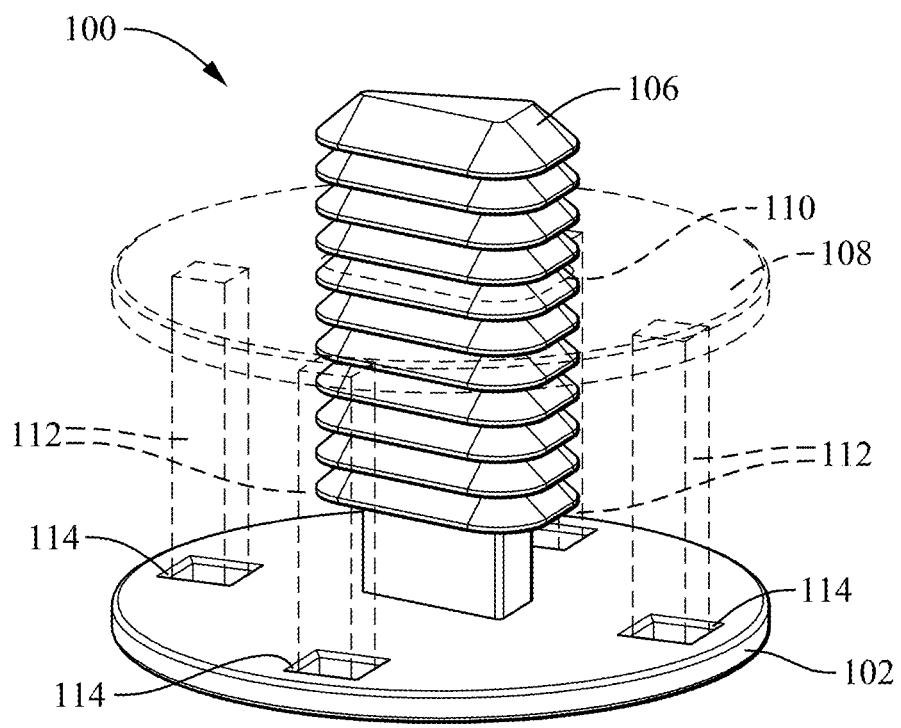
FIG. 1 is an isometric view of mounting device in accordance with an embodiment of the invention.
Figure 2:
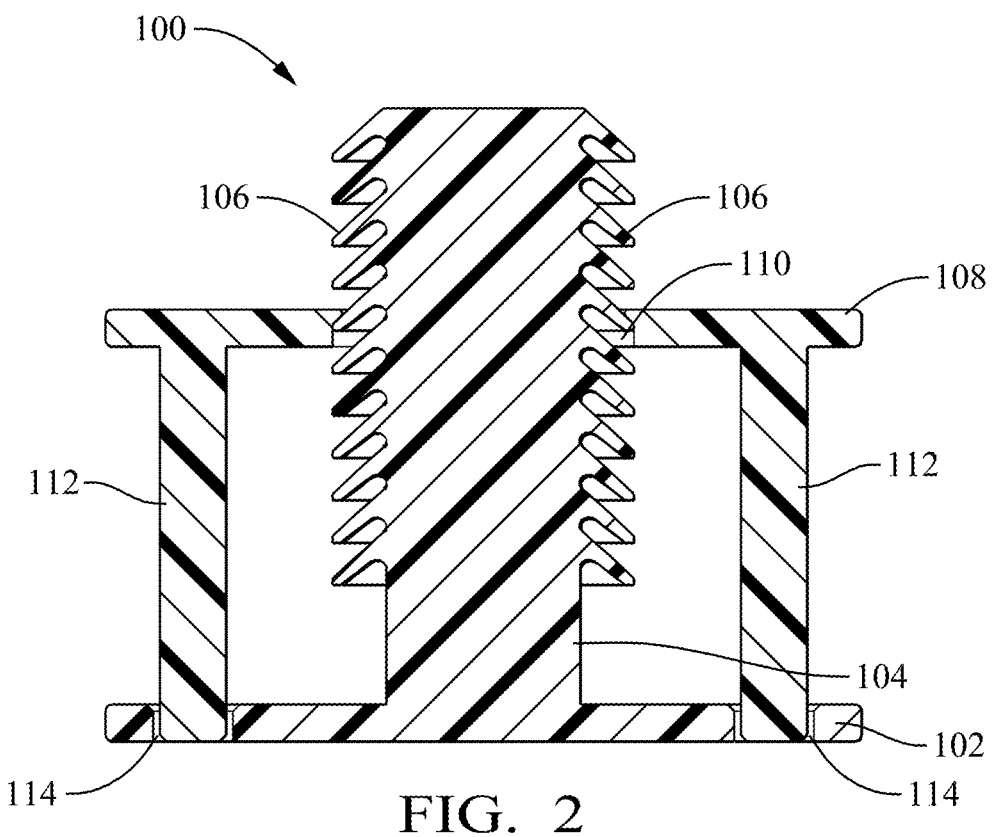
FIG. 2 is a cross-section view of the mounting device of FIG. 1 in accordance with an embodiment of the invention.

FIGS. 1-4 show a first non-limiting example of a mounting device 100 that is configured to secure a flat flexible electrical cable (FFC) and/or flexible printed circuit (FPC) to a substrate 2, e.g., a body panel of a vehicle, and to help route the FFC and/or FPC, e.g., along the substrate or through a structure. Hereafter, the flat flexible cables and the flexible printed circuits will be generically referred to as cables 4. The mounting device 100 includes a disc shaped base portion 102 and an attachment portion 104 extending generally perpendicular from the base portion 102. The attachment portion 104 is configured to be received within an opening 6 in the substrate 2 by a plurality of branches 106 extending from the attachment portion 104. The plurality of branches 106 curve or are angled away from a free end of the attachment portion 104. The base portion, 102, the attachment portion 104 and the plurality of branches 106 form a structure very similar to that commonly referred to as a fir or Christmas tree fastener, so called due to the shape of the barbed protrusions that run down the length of the fastener which resemble the branches of a fir tree. The mounting device 100 also includes a movable cap portion 108 that is spaced apart from the base portion 102. The cap portion 108 is also disk shaped and defines an aperture 110 in which the attachment portion 104 is received. The cap portion 108 is configured to move along the attachment portion 104. The plurality of branches 106 engage the edge of the aperture 110 inhibit removal of the attachment portion 104 from the aperture 110 due to the configuration of the plurality of branches 106. The mounting device 100 further includes a plurality of legs 112 that extend from the cap portion 108. The plurality of legs 112 is received within holes 114 defined in the base portion 102. The plurality of legs 112 forms a cage-like structure that is configured to retain the cable 4 between the base portion 102, the cap portion 108, and the attachment portion 104.

The attachment portion 104, the aperture 110, and the opening 6 in the substrate 2 are sized, shaped and arranged such that the attachment portion 104, the aperture 110, and the opening 6 are aligned in a single particular orientation. In order to provide this feature, the attachment portion 104 has a cross section with a width greater than length. A first width of one end of the cross section is less than a second width at the other end of the cross section. In the illustrated example the attachment portion 104 has a generally triangular cross-section, best seen in FIGS. 1 and 3. The aperture 110 and the opening 6 have a corresponding rounded triangular shape in order to accommodate the plurality of branches 106. The attachment portion may alternatively have a cross-section shape having a width on one end is less than a width at the other end, such as a trapezoidal shape.

Figure 3:
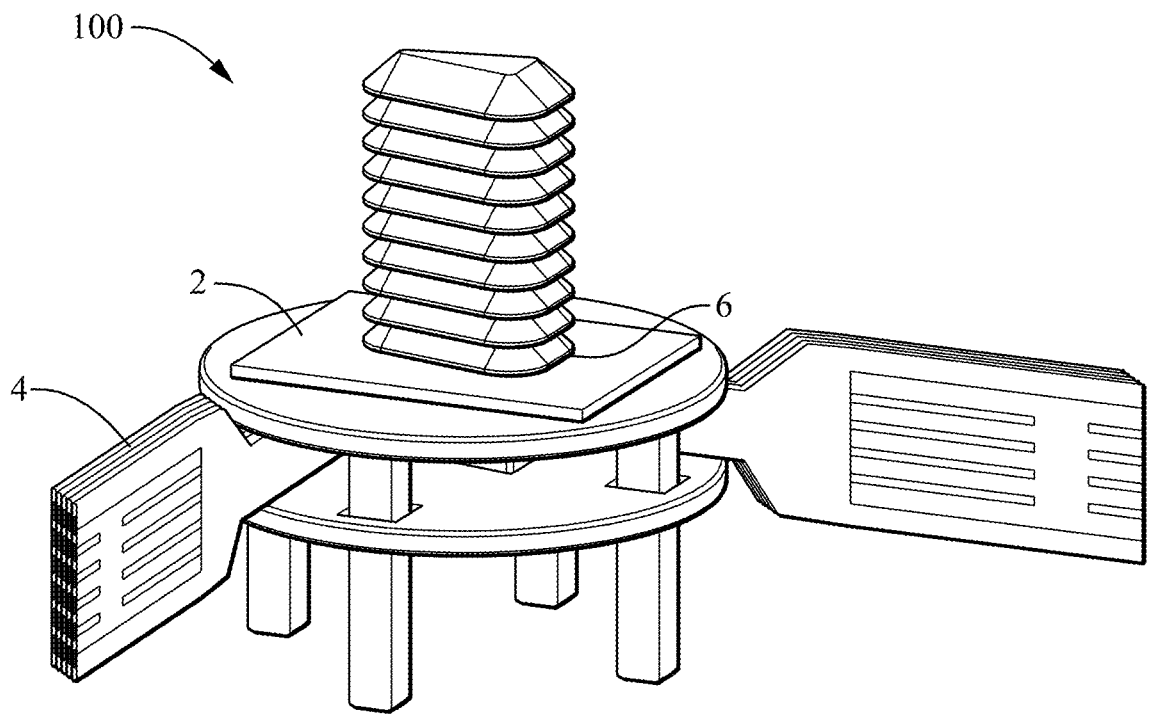
FIG. 3 is an isometric view of the mounting device of FIG. 1 retaining a flat electrical cable in accordance with an embodiment of the invention.
Figure 4:
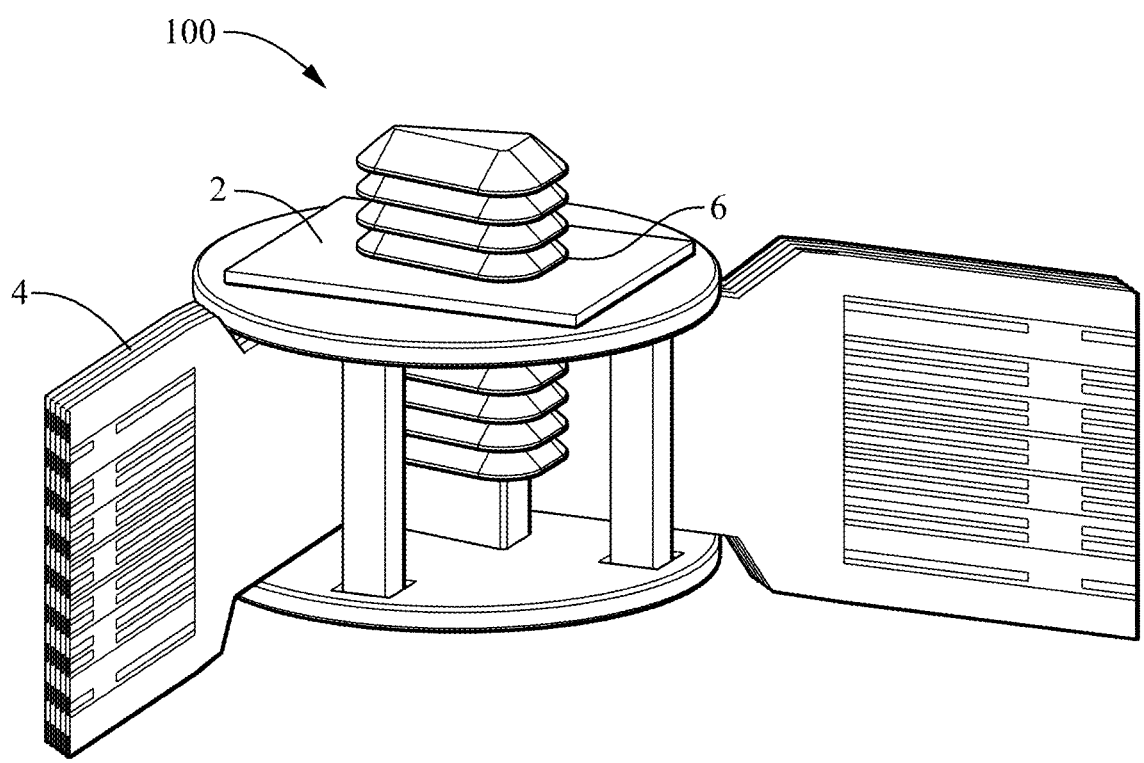
FIG. 4 is an isometric view of the mounting device of FIG. 1 retaining a wider flat electrical cable than shown in FIG. 3 in accordance with an embodiment of the invention.
Figure 5:
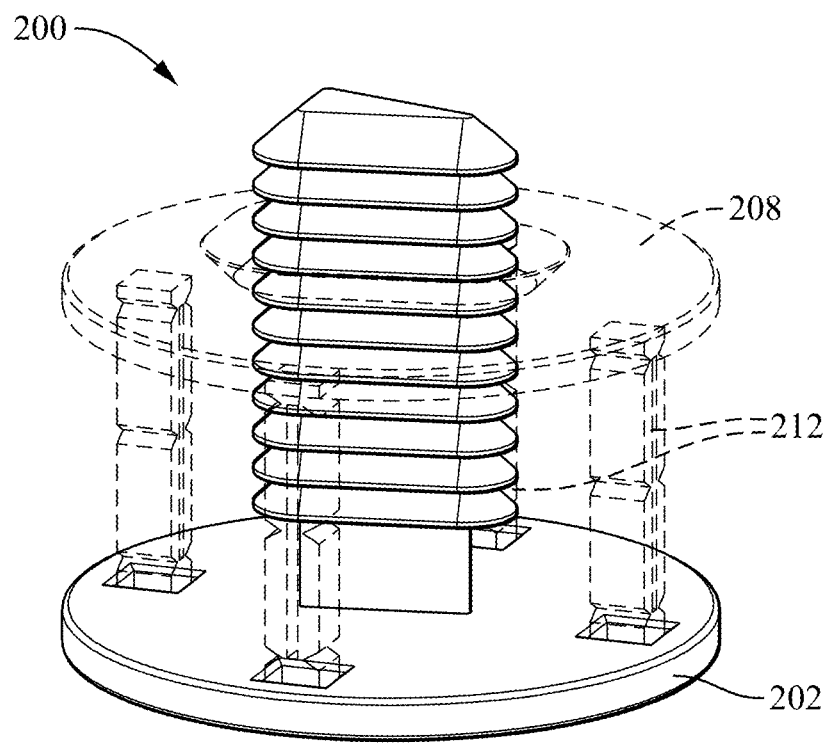
FIG. 5 is a side isometric view of a mounting device with a plurality of flexible legs extending from a cap portion in accordance with another embodiment of the invention.
Figure 6:
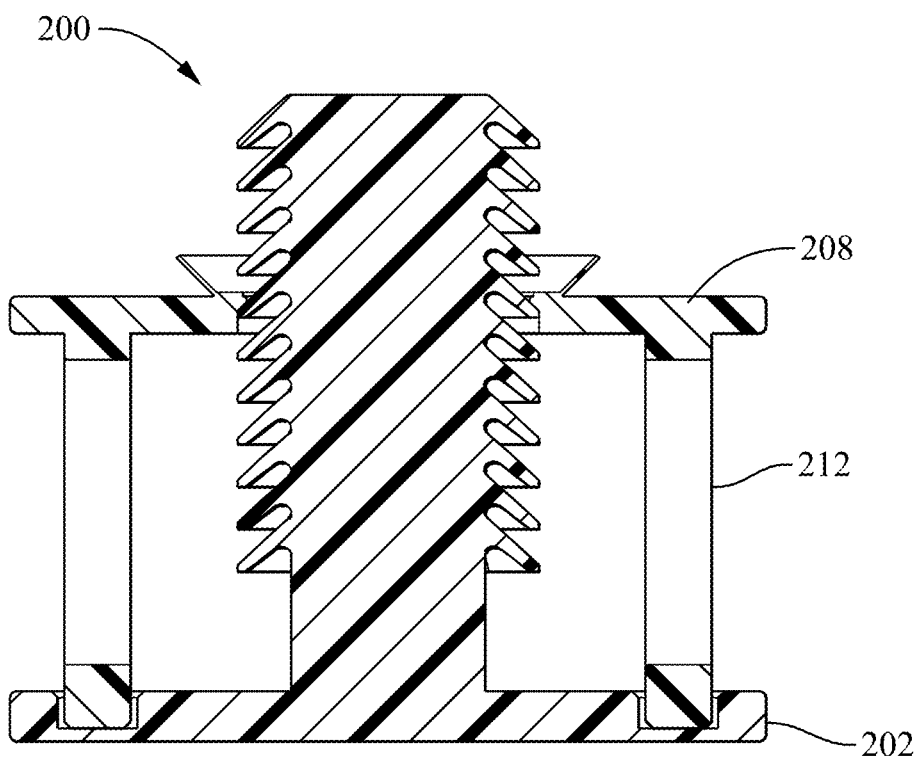
FIG. 6 is a cross-section view of the mounting device of FIG. 5 in accordance with another embodiment of the invention.
Figure 7:
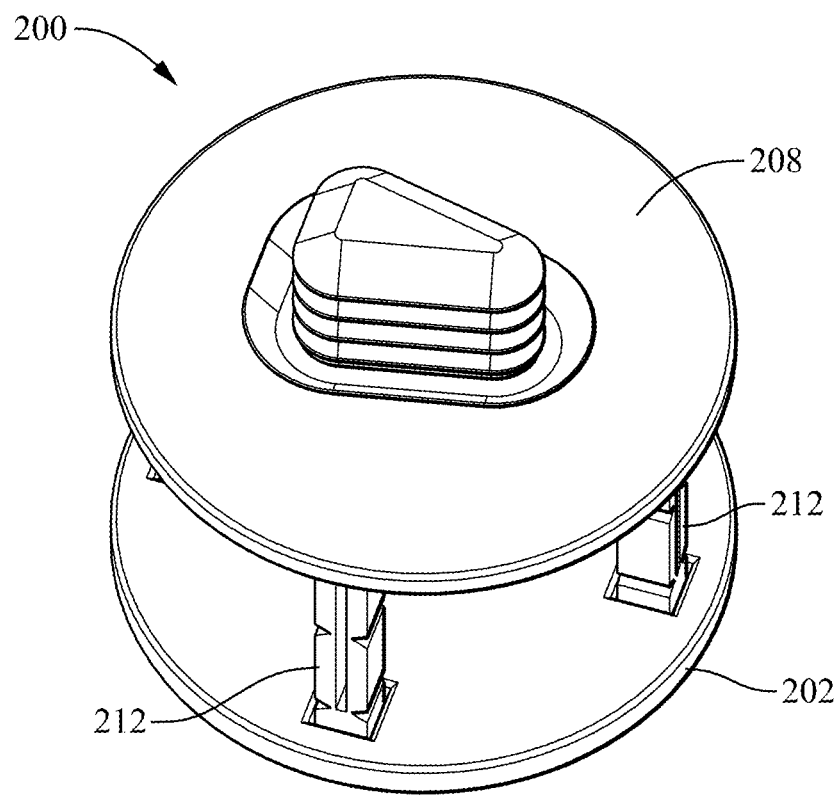
FIG. 7 is a top isometric view of the mounting device of FIG. 5 in accordance with another embodiment of the invention.
Figure 8:
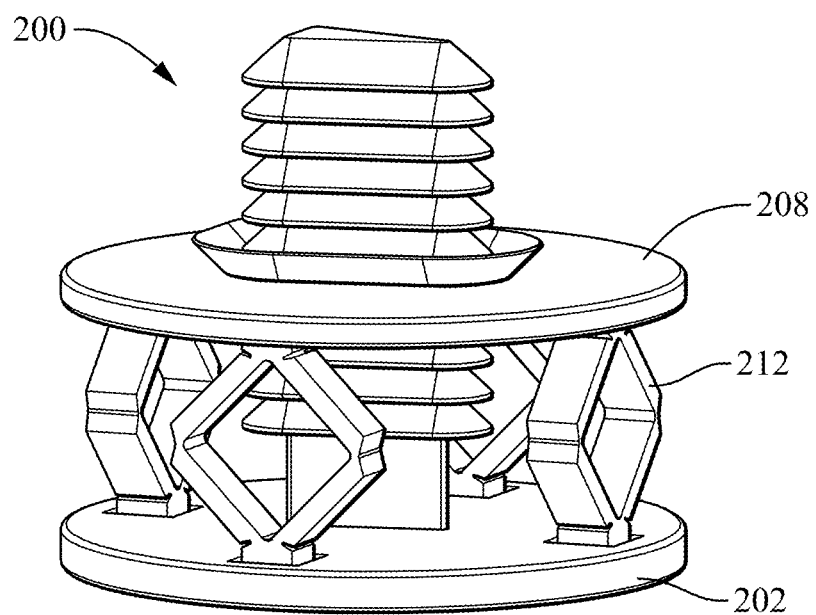
FIG. 8 is an isometric view of mounting device of FIG. 5 with the plurality of flexible legs in a flexed condition in accordance with another embodiment of the invention.
Figure 9:
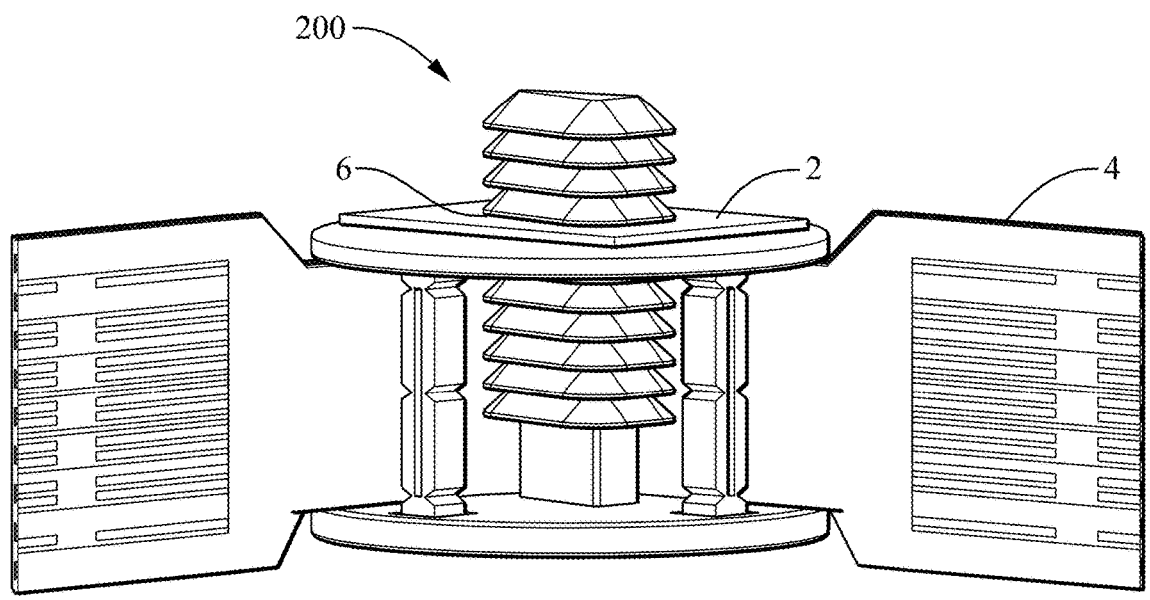
FIG. 9 is an isometric view of the mounting device of FIG. 5 retaining a flat electrical cable in accordance with another embodiment of the invention.

As shown in FIGS. 3 and 4, the distance between the base portion 102 and the cap portion 108 may be adjusted to accommodate cables 4 having different widths. The insulation between conductors in the cable 4 may be slit to gather the conductors, thereby narrowing the width of the cable 4 in the mounting device 100 as shown in FIGS. 3 and 4.

FIGS. 5-9 show a second non-limiting example of a mounting device 200 configured to secure a cable 4 to a substrate 2 and to help route the cable 4. The mounting device 200 differs from the mounting device 100 mainly in that the plurality of legs 212 extending from the cap portion 208 do not extend though openings in the base portion 202 but rather abuts the base portion 202. The plurality of legs 212 are flexible and are arranged in pairs that are configured to flex away from one another as the cap portion 208 is moved closer to the base portion 202 as shown by comparing FIGS. 5 and 8.

Figure 10:
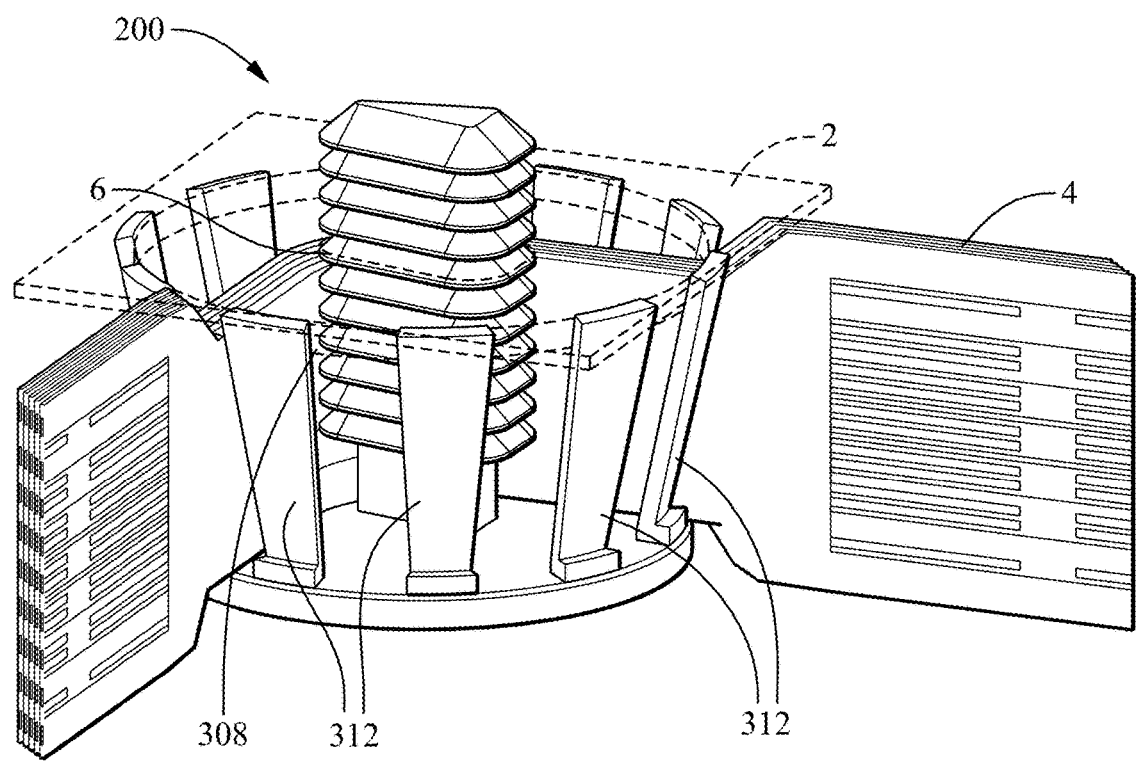
FIG. 10 is an isometric view of a mounting device retaining a flat electrical cable in accordance with yet another embodiment of the invention.
Figure 11:
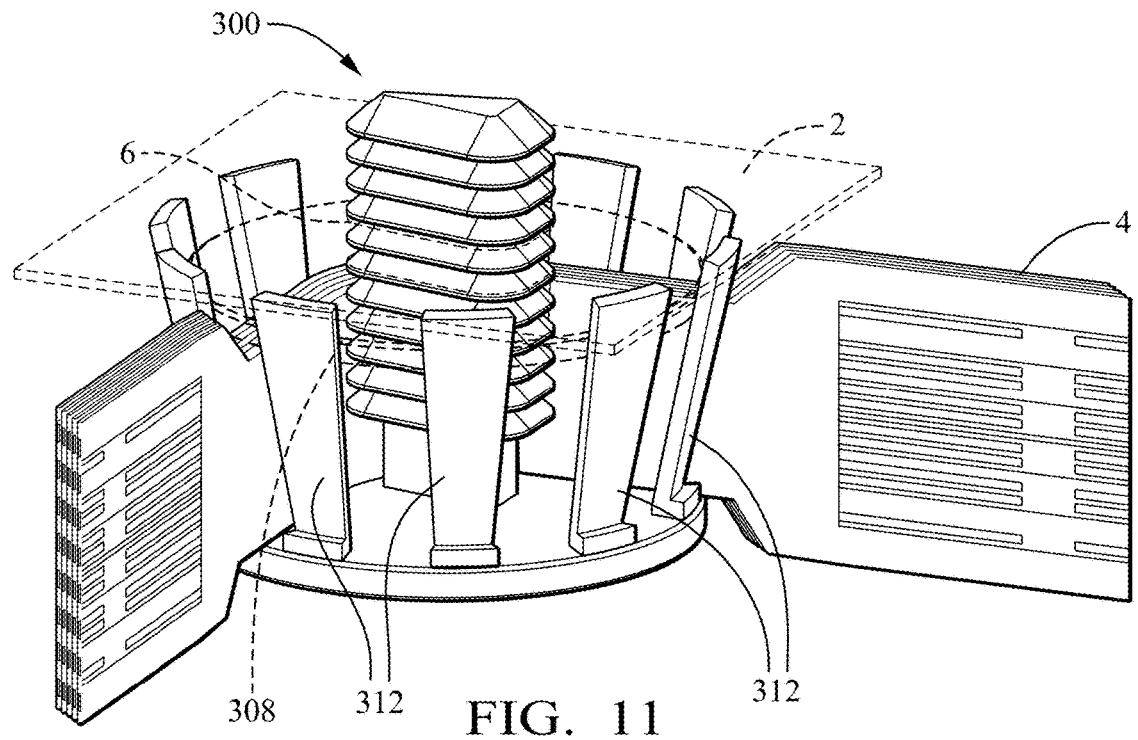
FIG. 11 is an isometric view of the mounting device of FIG. 10 retaining a narrower flat electrical cable than shown in FIG. 10 in accordance with yet another embodiment of the invention.
Figure 12:
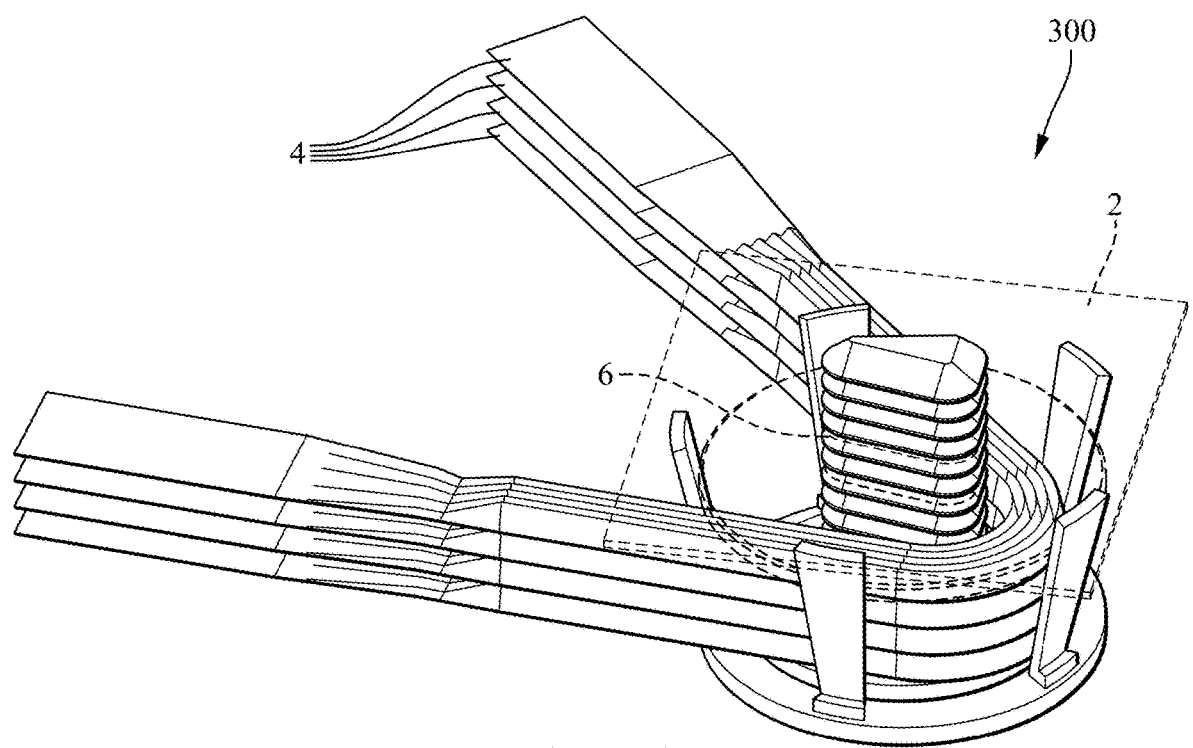
FIG. 12 is an isometric view of the mounting device of FIG. 10 retaining a plurality of flat electrical cables in accordance with yet another embodiment of the invention.
Figure 13:
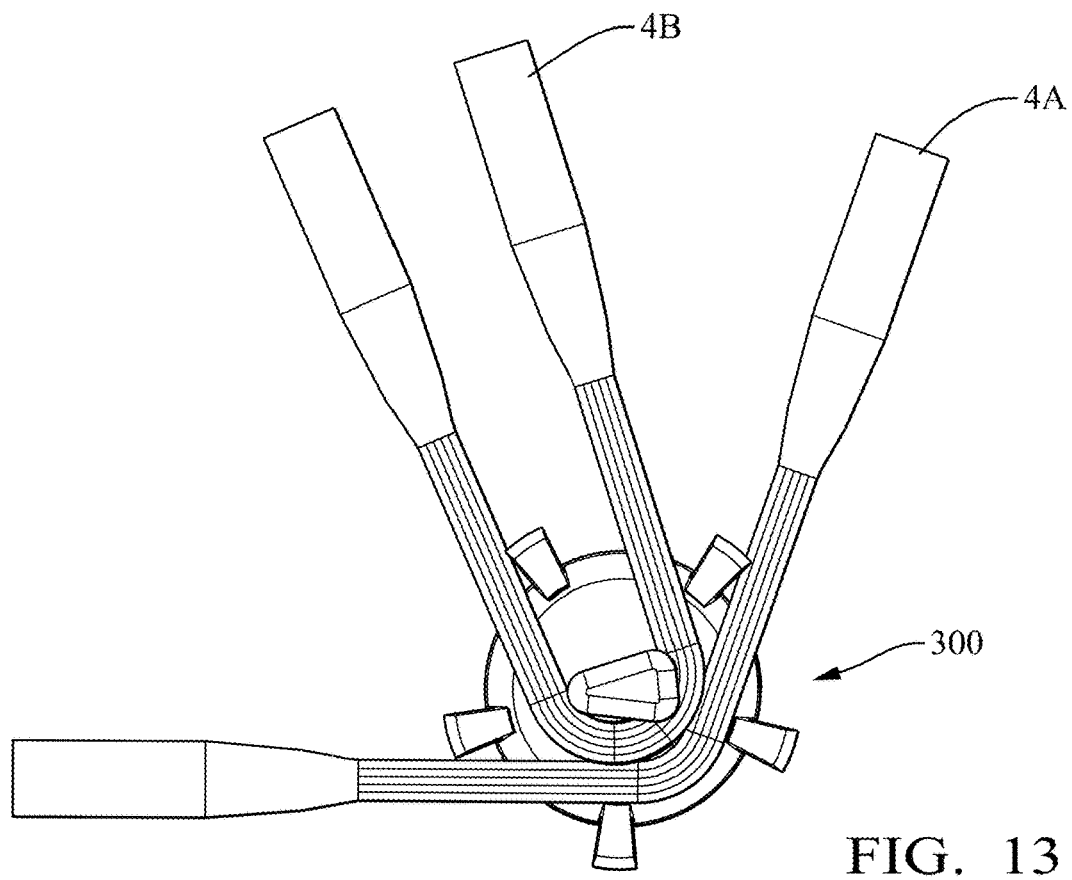
FIG. 13 is top view of the mounting device of FIG. 12 retaining a plurality of flat electrical cables in which one flat electrical cable has a radius of curvature that is shorter than a radius of curvature of the other flat electrical cable in accordance with yet another embodiment of the invention.

FIGS. 10-16 show a third non-limiting example of a mounting device 300 configured to secure a cable 4 to a substrate 2 and to help route the cable 4. The mounting device 300 differs from the mounting device 100 mainly in that the plurality of legs 312 extend from the edges of the base portion 302 rather than from the cap portion 308. The plurality of legs 312 is flexible and are outwardly flexed by contact with the edges of the cap portion 308 as shown in FIGS. 10 and 11.

Figure 14:
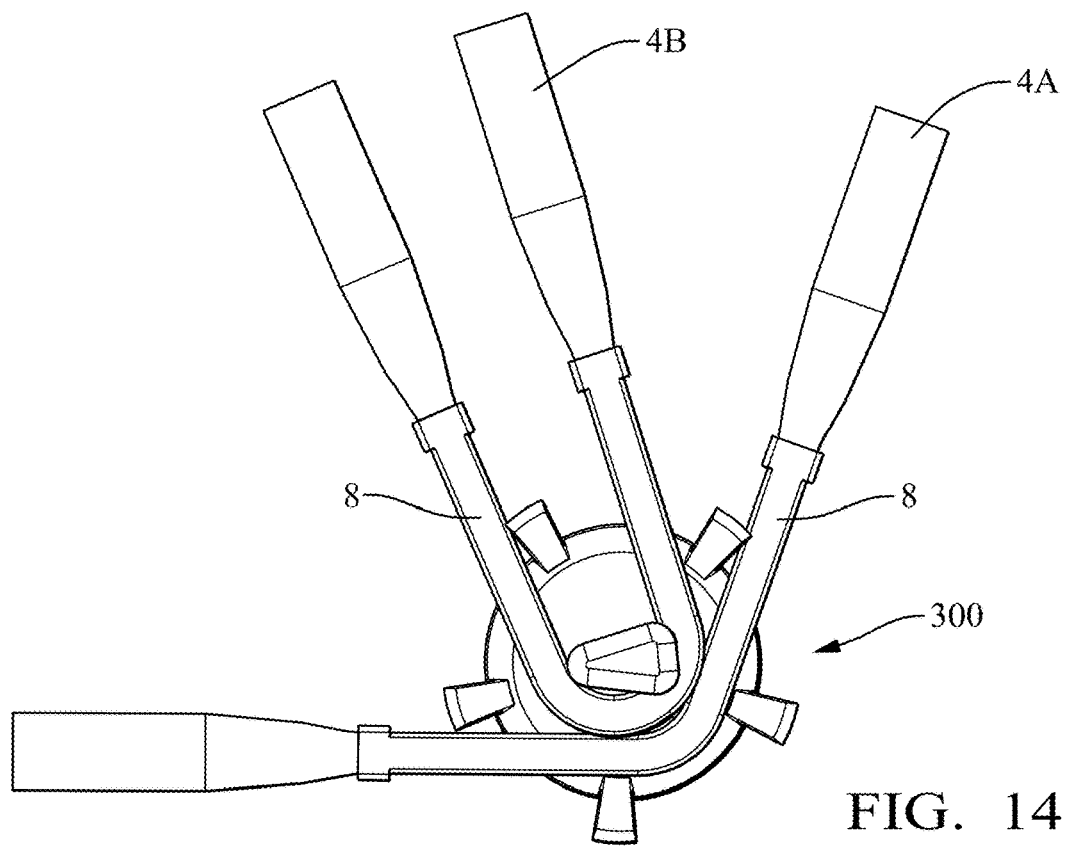
FIG. 14 is top view of the mounting device of FIG. 12 including cable support devices attached to the flat electrical cables to maintain the radii of curvature in accordance with yet another embodiment of the invention.
Figure 15:
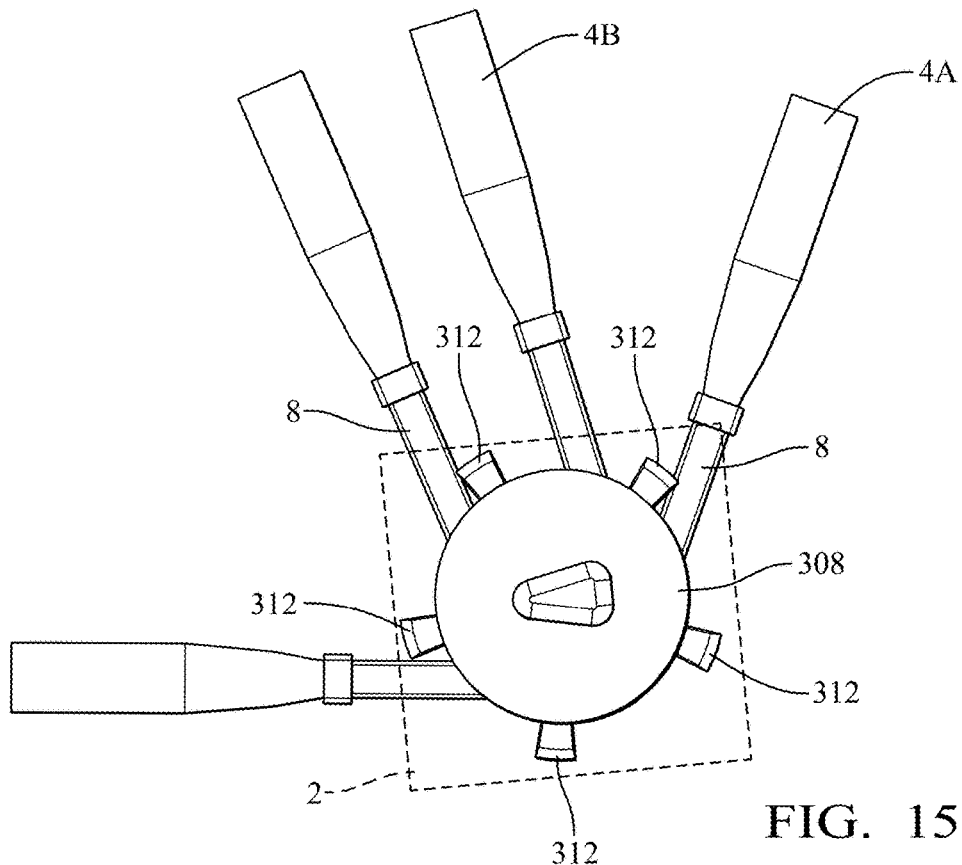
FIG. 15 is top view of the mounting device of FIG. 14 including a cap portion and substrate in accordance with yet another embodiment of the invention.
Figure 16:
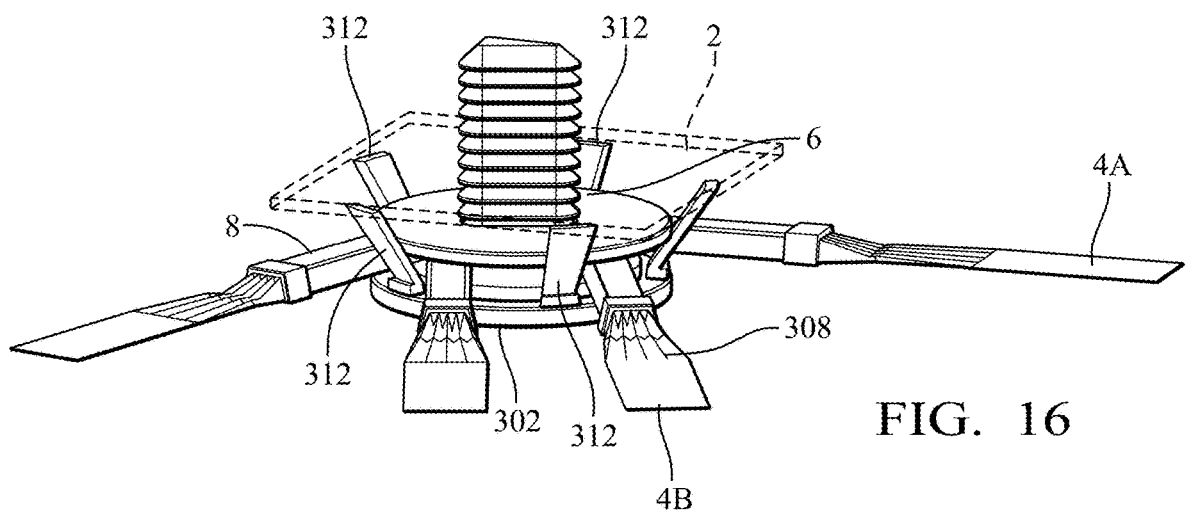
FIG. 16 is an isometric view of the mounting device of FIG. 15 in accordance with yet another embodiment of the invention.

As shown in FIG. 13-16, the mounting device 300 may retain more than one cable 4. The cables 4 may be routed so that a first cable 4A has a smaller radius of curvature than a second cable 4B. This may be accomplished by the retaining the second cable 4B between more legs of the plurality of legs 312 than the first cable 4A. The first and second cables 4A, 4B may also include cable support devices 8 as shown in FIGS. 14-16 to help maintain the radii of curvature of the first and second cables 4A, 4B.

The mounting devices 100 and 200 may also be used to retain more than one cable 4, similarly to the examples shown for mounting device 300 in FIGS. 13-16.

The mounting devices 100, 200 shown herein provide multi-directional routing capability for the cables 4 and a unidirectional attachment portion 104. The access and egress of the cables 4 to and from the mounting devices 100, 200 at multiple locations allows for a high degree of application flexibility. The single particular orientation of the attachment portion 104 allows the mounting devices 100, 200 to be oriented in particular directions to facilitate more precise cable routing while minimizing the number of mounting devices 100, 200 needed. The mounting devices 100, 200 are configured to allow routing of the cables 4 without folding the cables 4. The insulation between the wires in the cables 4 may be slit, i.e., singulated, as shown in the various figures to allow the wires in the cables 4 to be bundled together and provide a more compact height of the cables 4 and mounting devices 100, 200. Additional features, such as tape tabs or shoulders, may be added to the mounting devices 100, 200 to restrict lateral movement of the cables 4 if needed.

The examples presented herein are directed to mounting devices 100, 200 and components thereof configured to cables 4. However, other embodiments of the mounting devices 100, 200 may be envisioned that are adapted to retain other elongated items and articles such as fiber optic cables, pneumatic lines, hydraulic lines, cables, ropes, vines, etc., or a combination of any of these.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A mounting device configured to attach an elongated article to a substrate, said mounting device comprising:
   a base portion;
   an attachment portion extending from the base portion, configured to be received within an opening in the substrate, and having a plurality of branches extending therefrom;
   a cap portion spaced apart from the base portion and defining an aperture in which the attachment portion is received, wherein the plurality of branches engage the aperture and are configured to inhibit removal of the attachment portion from the aperture; and
   a plurality of legs extending between the base portion and the cap portion configured to retain the elongated article between the base portion and the cap portion.

2. The mounting device according to claim 1, wherein the elongated article is a flat flexible electrical cable.

3. The mounting device according to claim 1, wherein the elongated article is a flexible printed circuit.

4. The mounting device according to claim 2, wherein the mounting device is configured to retain the flat electrical cable between the base portion, the attachment portion, the cap portion and at least one leg of the plurality of legs.

5. The mounting device according to claim 1, wherein the attachment portion and the aperture are sized, shaped and arranged such that the attachment portion and the aperture are aligned in a single particular orientation.

6. The mounting device according to claim 5, wherein the attachment portion has a rounded triangular cross-section, and the aperture has a corresponding rounded triangular shape.

7. The mounting device according to claim 1, wherein the plurality of legs extend from the cap portion.

8. The mounting device according to claim 7, wherein the plurality of legs extend through holes defined in the attachment portion.

9. The mounting device according to claim 7, wherein the plurality of legs are jointed and extend between the cap portion and the attachment portion.

10. The mounting device according to claim 9, wherein a pair of legs in the plurality of legs have joints that are configured to allow the pair of legs to flex away from each other.

11. The mounting device according to claim 1, wherein the plurality of legs extend from the attachment portion.

12. The mounting device according to claim 11, wherein the plurality of legs extend from an edge of the attachment portion and beyond the cap portion.

13. The mounting device according to claim 11, wherein the substrate serves as the cap portion.

14. The mounting device according to claim 1, further comprising:
    the elongated article which is a first elongated article that is positioned between the base portion, the attachment portion, the cap portion, and m legs of the plurality of legs; and
    a second elongated article which is positioned between the base portion, the attachment portion, the cap portion, and m+n legs of the plurality of legs, wherein m and n are nonzero integers.

15. The mounting device according to claim 14, wherein the first elongated article has a first radius of curvature around the attachment portion and the second elongated article has a second radius of curvature around the attachment portion that is shorter than the first radius of curvature.

16. A method of attaching an elongated article to a substrate, comprising:
    providing a mounting device having:
        a base portion,
        an attachment portion extending from the base portion and having a plurality of branches extending therefrom,
        a cap portion spaced apart from the base portion and defining an aperture in which the attachment portion is received, wherein the plurality of branches engage the aperture and are configured to inhibit removal of the attachment portion from the aperture, and
        a plurality of legs extending between the base portion and the cap portion configured to retain the elongated article between the base portion and the cap portion;
    disposing the elongated article in the mounting device such that it is positioned between the base portion, the attachment portion, the cap portion, and m legs of the plurality of legs, wherein m is a nonzero integer; and
    inserting the attachment portion within an opening in the substrate, wherein the plurality of branches engage the opening and are configured to inhibit removal of the attachment portion from the opening.

17. The method according to claim 16, wherein the attachment portion and the opening are sized, shaped and arranged such that the attachment portion and the opening are aligned in a single particular orientation.

18. The method according to claim 17, wherein the attachment portion has a rounded triangular cross-section, and the opening has a corresponding rounded triangular shape.

19. The method according to claim 16, wherein the elongated article is a first elongated article and wherein the method further includes routing a second elongated article through the mounting device such that it is positioned between the base portion, the attachment portion, the cap portion, and m+n legs of the plurality of legs, wherein n is a nonzero integer.

20. The method according to claim 16, wherein the elongated article is selected from a list consisting of a flat flexible electrical cable and a flexible printed circuit.

* * * * *